US009282178B2

(12) United States Patent
Jeong et al.

(10) Patent No.: US 9,282,178 B2
(45) Date of Patent: Mar. 8, 2016

(54) METHOD FOR PROVIDING CALL LOG AND ELECTRONIC DEVICE THEREOF

(71) Applicant: Samsung Electronics Co., Ltd., Suwon-si, Gyeonggi-do (KR)

(72) Inventors: Jin-Hong Jeong, Yongin-si (KR); Pil-Joo Yoon, Seongnam-si (KR); Sun-Kee Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/227,241

(22) Filed: Mar. 27, 2014

(65) Prior Publication Data

US 2014/0334616 A1 Nov. 13, 2014

(30) Foreign Application Priority Data

May 7, 2013 (KR) ........................ 10-2013-0051375

(51) Int. Cl.
*H04M 1/56* (2006.01)
*H04M 15/06* (2006.01)
*H04M 1/57* (2006.01)
*H04M 19/04* (2006.01)

(52) U.S. Cl.
CPC .............. *H04M 1/576* (2013.01); *H04M 19/04* (2013.01); *H04M 2250/60* (2013.01)

(58) Field of Classification Search
CPC ..................... H04M 3/42042; H04M 3/42059; H04M 3/436; H04M 15/06; H04M 1/575; H04M 1/57

USPC .............. 379/142.01, 142.06, 142.1, 142.15; 455/415

See application file for complete search history.

(56) References Cited

U.S. PATENT DOCUMENTS

| 7,240,290 | B2* | 7/2007 | Melideo ........................ 715/764 |
| 8,290,132 | B2* | 10/2012 | Klemm ....................... 379/142.1 |
| 8,705,707 | B1* | 4/2014 | Schilit et al. ................ 379/88.11 |
| 8,787,897 | B2* | 7/2014 | Khosravi ....................... 455/418 |
| 2003/0148753 | A1* | 8/2003 | Pappalardo et al. .......... 455/405 |
| 2008/0088700 | A1* | 4/2008 | Mornhineway et al. ........ 348/61 |
| 2008/0270613 | A1* | 10/2008 | Bamford et al. .............. 709/227 |
| 2014/0349690 | A1* | 11/2014 | Yang ............................ 455/466 |

FOREIGN PATENT DOCUMENTS

| KR | 20030090140 A | 11/2003 |
| KR | 20070092554 A | 9/2007 |
| KR | 20100010492 A | 2/2010 |
| KR | 20100092848 A | 8/2010 |
| KR | 20110088820 A | 8/2011 |

* cited by examiner

*Primary Examiner* — Quoc D Tran
(74) *Attorney, Agent, or Firm* — Jefferson IP Law, LLP

(57) ABSTRACT

A method of providing a call log in an electronic device is provided. The method includes displaying a content including call identifier information, storing information corresponding to the call identifier information from the content, and using the stored information for at least one of a call log and a contact list.

22 Claims, 15 Drawing Sheets

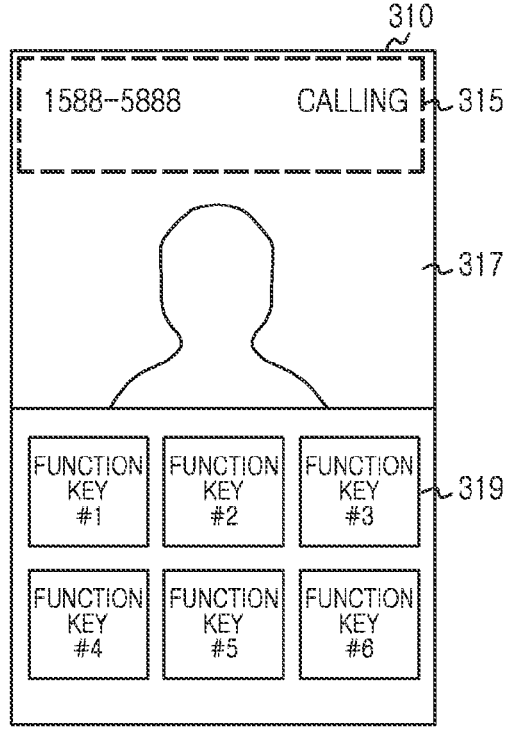
FIG.3A  FIG.3B
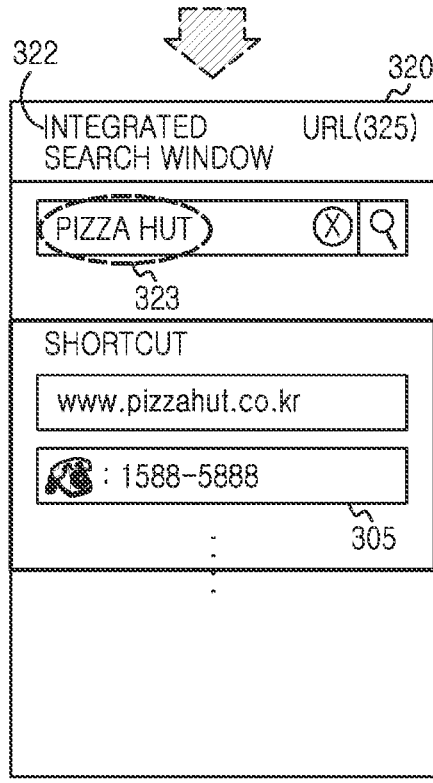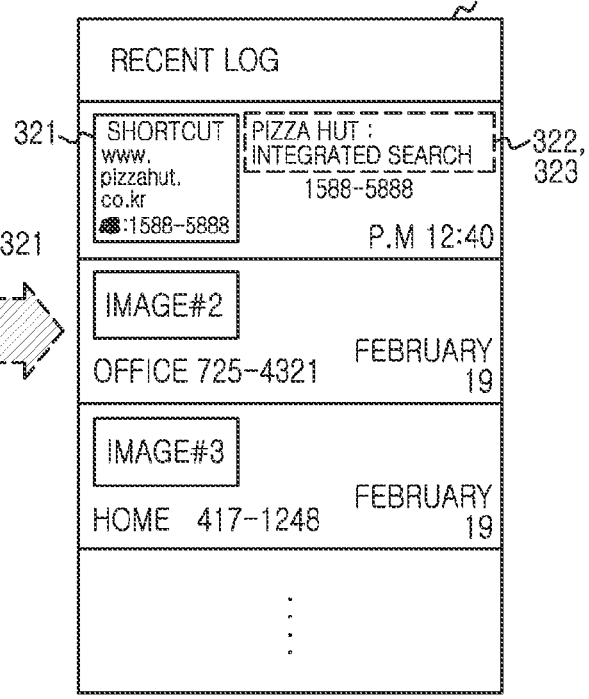
FIG.3C  FIG.3D

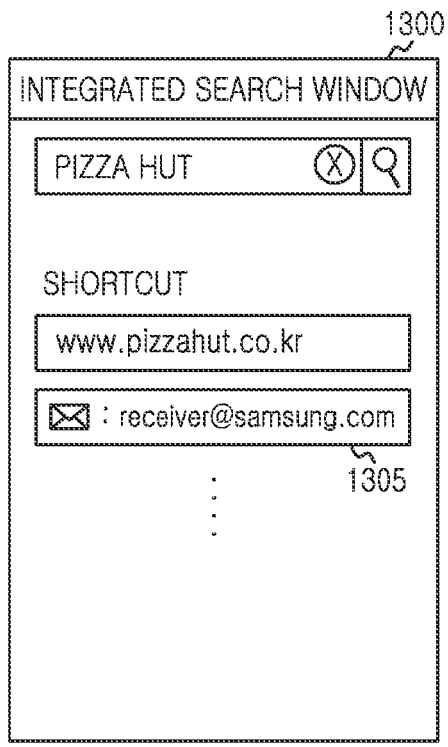
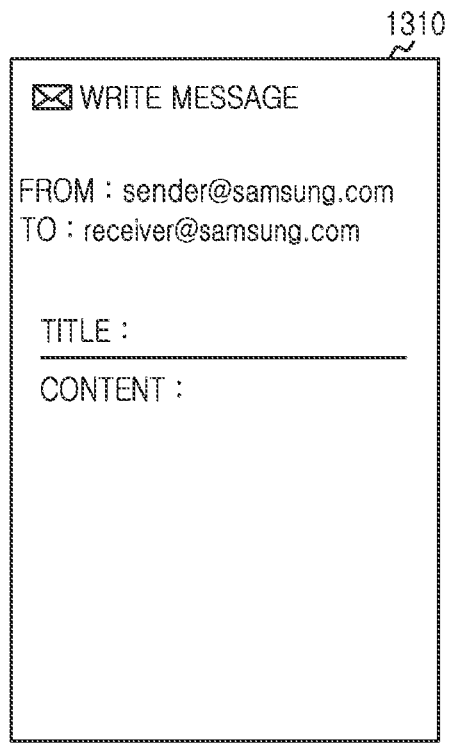
FIG.13A
FIG.13B
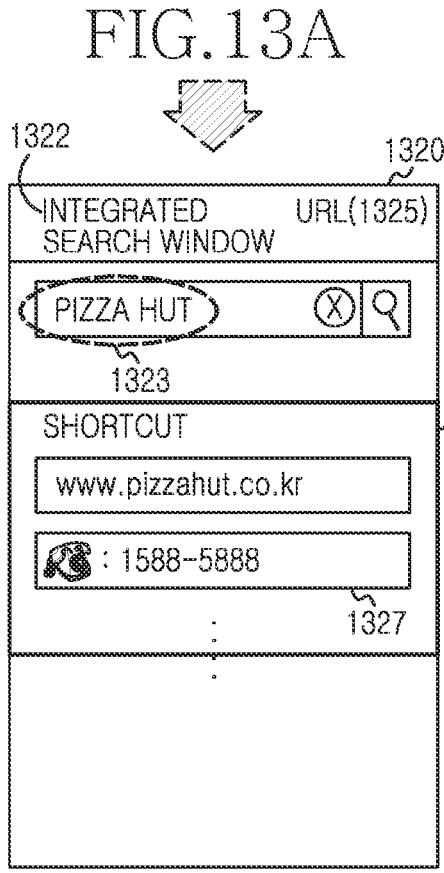
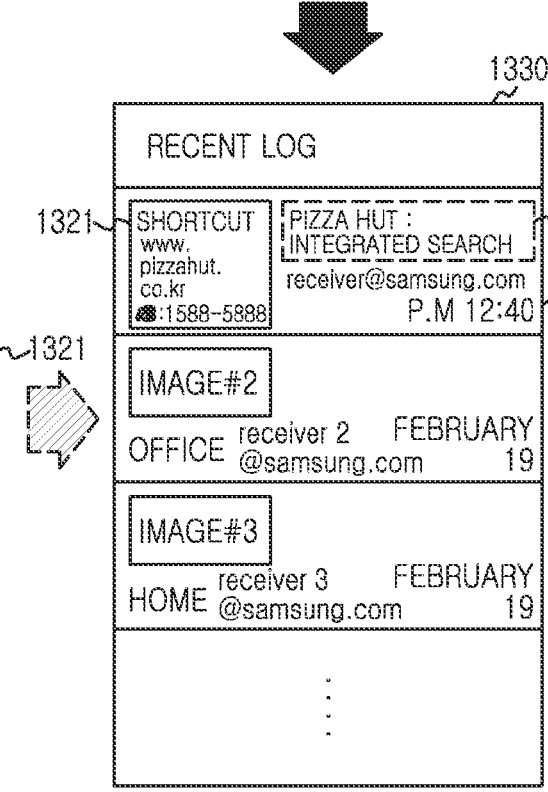
FIG.13C
FIG.13D

METHOD FOR PROVIDING CALL LOG AND ELECTRONIC DEVICE THEREOF

CROSS-REFERENCE TO RELATED APPLICATION(S)

This application claims the benefit under 35 U.S.C. §119 of a Korean patent application filed on May 7, 2013 in the Korean Intellectual Property Office and assigned Serial number 10-2013-0051375, the entire disclosure of which is hereby incorporated by reference.

TECHNICAL FIELD

The present disclosure relates generally to a method for providing a call log during a call function and an electronic device thereof.

BACKGROUND

In general, electronic devices, such as mobile terminals, smartphones, and portable terminals, automatically register a call in a call log after a performing call function.

A call log function records information on another party (e.g., another user or contact) whom a user of an electronic device makes a call. In addition, when the user attempts to make a call by selecting an item from a call log list, the call log function connects a call to another party that the user called before corresponding to the selected call item. In addition or in the alternative, the call log function may be used for recording a content on another party with whom a call or communication is made.

For example, the call log function does not merely record the phone number of the other party and call time as a call list. The call log function also allows a user to easily retrieve information corresponding to the corresponding other party phone number by searching for information recorded on a phone book on the basis of the phone number of the other party, so that a user may determine relevant contact information associated with the other party (e.g., determine who is the other party) with ease. If the corresponding other party phone number is not recorded on the phone book, information corresponding to the corresponding other party phone number is not provided.

Recently, the phone number of the other party may be searched from a phone book and information corresponding to the phone number of the other party may be provided from information recorded on a server through internet communication. Thereafter, the phone number of the other party and/or the information corresponding to the phone number of the other party may be displayed by an electronic device.

According to the related art, information corresponding to the phone number of the other party may be provided from an internal memory of an electronic device or from an internet server.

If there is a linked (e.g., tagged) phone number in a webpage or a message in an electronic device according to the related art, and if the linked phone number is selected, a call establishment may be attempted to the linked phone number. For example, a call is made by selecting a phone number of another party received through a messenger or through a result searched through a webpage.

FIG. 1 is a view illustrating a call connection using a phone number link tag in a webpage and a recent call list according thereto through a technique according to the related art.

Referring to FIG. 1, a screen 100 is a search result screen when a search word "Pizza Hut" is input and searched in a specific integrated webpage. As illustrated in FIG. 1, a Pizza Hut homepage address or phone number may be provided on a screen.

At this point, if a Pizza Hut phone number "1588-5888" 105 of a link tag is selected by a user of an electronic device, then, as shown in a screen 110, a phone call application may provide a call connection to "1588-5888" 105. In the call connection screen 110, a dialed phone number (e.g., 1588-5888) 115, the other party image information 117, or a plurality of function keys 119 may be provided. If the other party image is not registered, a default image is provided. The plurality of function keys are soft keys for end call, call recording, keypad, and call sound mute. Thereafter, when the call connection is terminated, as shown in a screen 120, a call connection content 125 of 1588-5888 may be recorded in a call log list.

FIG. 2 is a view illustrating a call connection using a phone number link tag in a message and a recent call list according thereto through a technique according to the related art.

Referring to FIG. 2, a screen 200 is a screen of receiving the Pizza Hut phone number received from another party user during message transmission through a message application. If a Pizza Hut phone number "1588-5888" 205 of a link tag is selected by a user of an electronic device, as shown in a screen 210, a phone call application may provide a call connection to "1588-5888" 205. In the call connection screen 210, a dialed phone number (e.g., 1588-5888) 215, the other party image information 217, or a plurality of function keys 219 may be provided. If the other party image is not registered, a default image is provided. The plurality of function keys are soft keys for end call, call recording, keypad, and call sound mute. Thereafter, when the call connection is terminated, as shown in a screen 220, a call connection content 225 of 1588-5888 may be recorded in a call log list.

Although a call connection is attempted conveniently and easily by using a phone number link tag in a content (e.g., a webpage or an instant message including the phone number link tag), after the call is connected, because only an outgoing phone number is provided in a call log list and because a user may have difficulty remembering the other party associated with an incoming or dialed phone number and a target, the user may have difficulty remembering to whom the user makes a call.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages below. Accordingly, an aspect of the present disclosure is to provide a method and device for providing a call log.

Another aspect of the present disclosure is to provide a method and device for obtaining information to record a call content in a call log list in an electronic device.

Another aspect of the present disclosure is to provide a method and device for recording a call log by extracting information from a content to automatically link an incoming phone number and an incoming target when a call function is performed by using the content including phone number tag information in an electronic device.

In accordance with an aspect of the present disclosure, a method of providing a call log in an electronic device is provided. The method includes displaying a content including call identifier information; storing information corresponding to the call identifier information from the content; and using the stored information for at least one of a call log or a contact list.

In accordance with another aspect of the present disclosure, an electronic device is provided. The electronic device includes at least one processor, a memory, and at least one program stored in the memory and configured to be executed by the at least one processor, wherein the at least one program comprises an instruction for displaying a content including call identifier information, storing information corresponding to the call identifier information from the content, and using the information corresponding to the call identifier information for a call log or a contact list.

In accordance with another aspect of the present disclosure, a method for associating contact information with a contact in an electronic device is provided. The method includes displaying a content including contact information, detecting a request to communicate with a contact associated with the displayed contact information, determining whether the contact associated with the displayed contact information exists in a database of contacts, and storing information corresponding to the displayed contact information in at least one of a communication log and the database of contacts if the contact associated with the displayed contact information is determined not to exist in a database of contacts.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other objects, features, and advantages of certain embodiments of the present disclosure will be more apparent from the following description taken in conjunction with the accompanying drawings, in which:

FIGS. 3A, 3B, 3C, and 3D are views illustrating a call connection using a phone number link tag in a message and a recent call list according thereto according to various embodiments of the present disclosure.

FIGS. 13A, 13B, 13C, and 13D are views illustrating mail transmission using an E-mail link tag in a webpage, for example, one of content, and a recent mail list according thereto according to various embodiments of the present disclosure.

Throughout the drawings, it should be noted that like reference numbers are used to depict the same or similar elements, features, and structures.

DETAILED DESCRIPTION

Figure 1:
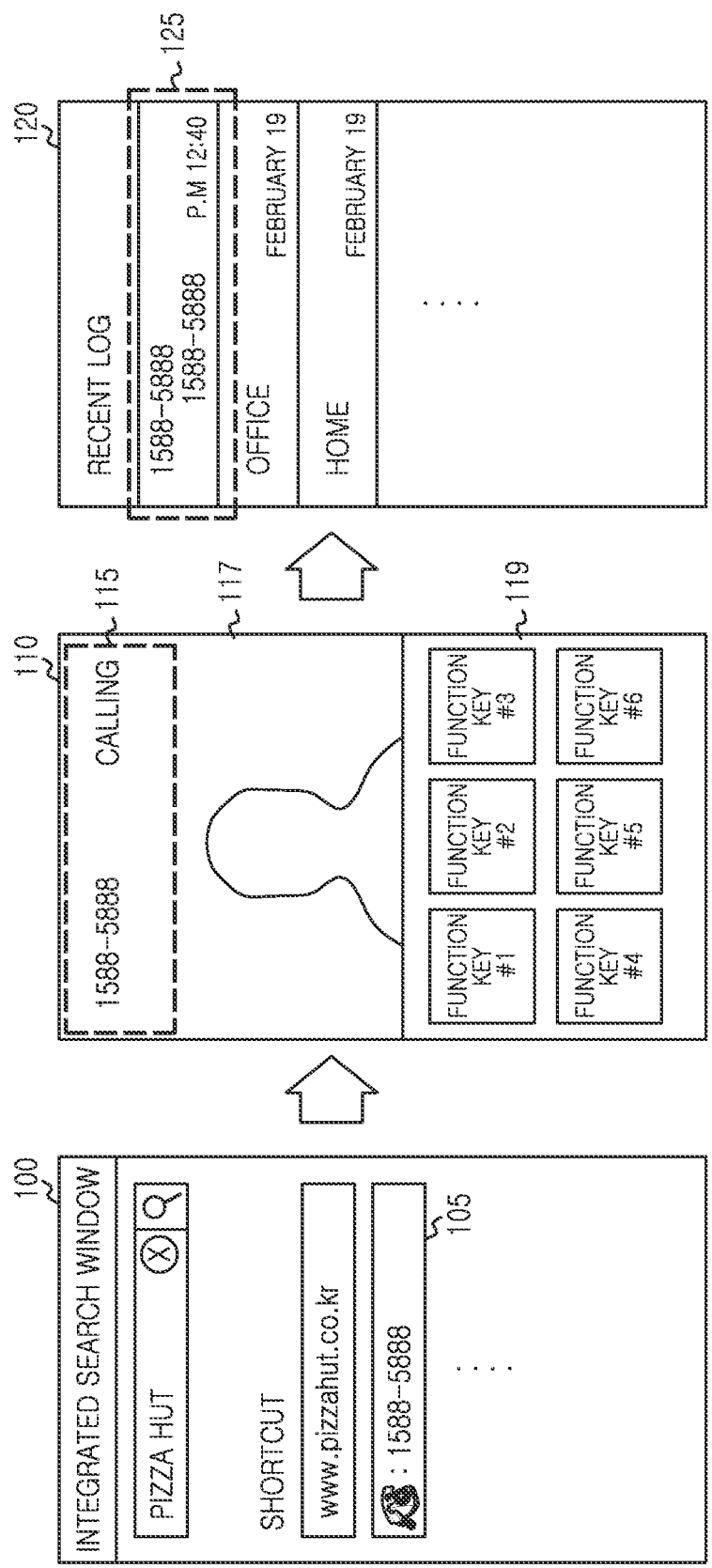
FIG. 1 is a view illustrating a call connection using a phone number link tag in a webpage and a recent call list according thereto through a technique according to the related art.
Figure 2:
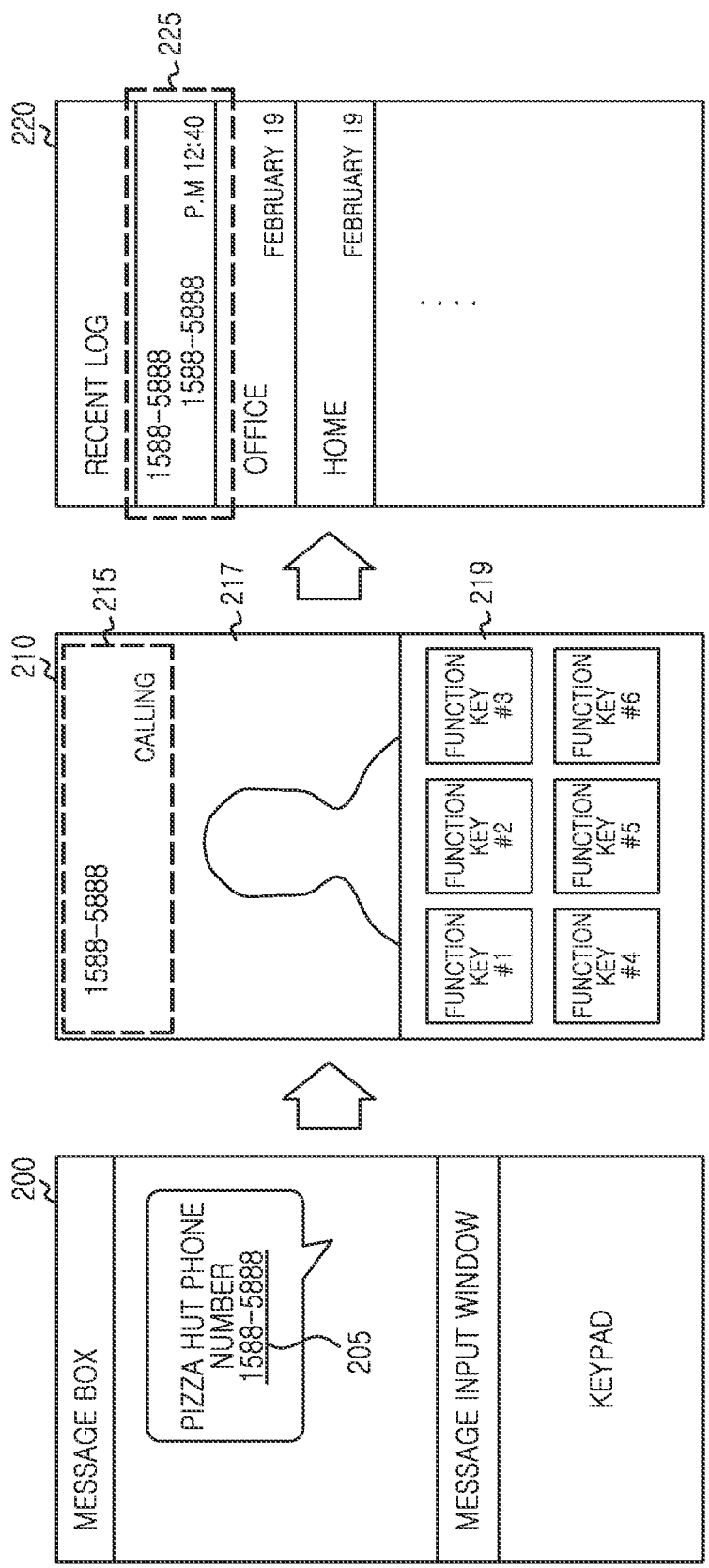
FIG. 2 is a view illustrating a call connection using a phone number link tag in a webpage and a recent call list according thereto through a technique according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions or constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include a method and apparatus for providing a call log and an electronic device thereof. According to various embodiments of the present disclosure, when a call function is performed by using a content including call identifier information, the other party identification information is extracted from the content and a result of the extraction is used as information of a corresponding phone number.

According to various embodiments of the present disclosure, a call may be one of a phone call, a video call, an E-mail, a Short Message Service (SMS) message, Multimedia Messaging System (MMS) message, and Social Networking Service (SNS) function, and/or the like. Hereinafter, various embodiments are described based on a phone number. However, a call log is not limited to a phone call.

Various embodiments according to the present disclosure may be applied to various communication methods performing a communication with the electronic device of another party by using call identifier information (e.g., a phone number, an E-mail address, SNS account information, and/or the like).

FIGS. 3A, 3B, 3C, and 3D are views illustrating a call connection using a phone number link tag in a message and a recent call list according thereto according to various embodiments of the present disclosure.

Referring to FIGS. 3A, 3B, 3C and 3D, a screen 300 of FIG. 3A is a search result screen when a search word "Pizza Hut" is input and searched in a specific integrated webpage. According to various embodiments of the present disclosure, a Pizza Hut homepage address or phone number 305 may be provided on a screen. According to various embodiments of the present disclosure, although not shown in the drawing, other content (e.g., an image, a map, a cafe, a blog, and/or the like) relating to the Pizza Hut in addition to the Pizza Hut homepage address or phone number 305 may be further provided. Moreover, a Pizza Hut homepage address or phone number may be link-tagged.

For example, if the Pizza Hut's phone number "1588-5888" 305 of a link tag is selected by a user of an electronic device, then, as shown in a call connection screen 310 of FIG. 3B, a phone call application may provide a call connection to "1588-5888" 305. In the call connection screen 310 of FIG. 3B, a dialed phone number (e.g., 1588-5888) 315, the other party image information 317, a plurality of function keys 319, and/or the like may be provided. If the other party image is not registered, a default image is provided, and the plurality of function keys are soft keys for end call, call recording, keypad, and call sound mute.

According to various embodiments of the present disclosure simultaneously (or contemporaneously) with a call connection procedure, as shown in a screen 320 of FIG. 3C, the other party information corresponding to an outgoing phone number (e.g., 1588-5888) 315 may be extracted from a specific homepage. For example, the other party information may include at least one of a capture image 321 of an entire or part of a specific homepage based on a phone number link tag, a webpage title 322, a search word 323, and a Uniform Resource Locator (URL) 325 of a searched webpage. According to various embodiments of the present disclosure, the webpage title 322 and the search word 323 may be combined and processed as one text information. For example, the webpage title 322 and the search word 323 may be combined and processed as one text information so as to be expressed in "Pizza Hut::Integrated search".

Figure 5:
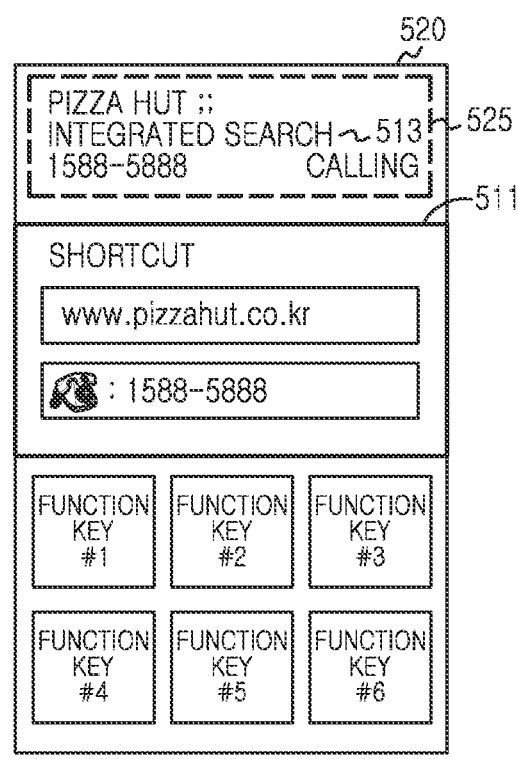
FIG. 5 is a view illustrating a call connection using a phone number link tag in a webpage and a recent call list according thereto according to various embodiments of the present disclosure.

According to various embodiments of the present disclosure, the other party information corresponding to the phone number (e.g., 1588-5888) 305 may be displayed on the call connection screen 310 of FIG. 3B during a call connection. For example, as shown in FIG. 5, extracted information may be displayed during a call connection.

The capture image may be used for an image area 321 of detailed information of the outgoing phone number (e.g., 1588-5888) 315 or the other party image information 317. Some areas of a webpage may correspond to predetermined areas based on a touch point when a call connection is performed through a touch operation of a phone number link tag. The predetermined areas may have the most appropriate size in consideration of the size of a thumbnail image displayed on a phone book or a call list. According to various embodiments of the present disclosure, through a method of analyzing a homepage frame or title information or parsing a text, the most relevant part to a phone number may be searched and then a corresponding part may be captured. According to various embodiments of the present disclosure, an image having a high related to a search word (e.g., Pizza Hut) may be selected from images included in the specific webpage 300.

In addition to the URL of the searched webpage, a resolution of a screen displaying the searched webpage or a scroll position in a browser may be tagged and stored. The resolution of the screen displaying the searched webpage or a scroll position may be stored for moving to a specific position of a homepage related to the outgoing phone number (e.g., 1588-5888) 315 when a URL link corresponding to the outgoing phone number (e.g., 1588-5888) 315 is selected at a later time.

The webpage title 322 or the search word 323 may be displayed on a name area in a call list. A number not registered to a phone number may be repeatedly displayed on a name area. According to various embodiments of the present disclosure, instead of displaying a phone number, the webpage title 322, the search word 323, or a text combining the webpage title 322 and the search word 323 may be displayed.

For example, because a corresponding search word and a webpage name are displayed on a webpage title area when a search word is input in a search site, the corresponding search word and the webpage name may be more likely to indicate to the user a relationship to a number to a corresponding phone number and may indicate to the user the reason that the user attempted a call connection to a corresponding number (e.g., a user is more likely to infer a kind of intention for attempting the call connection to the corresponding number based on the information provided).

If the call connection is terminated, as shown in a screen 330 of FIG. 3D, a call connection content 323 of 1588-5588 may be recorded in a call log list. The other party information related to the phone number "1588-5588" 305 extracted from the screen 320 of FIG. 3C, (e.g., the capture image 321, the webpage title 322, the search word 323, and the URL 325 of a searched webpage) may be recorded and displayed.

FIGS. 4A, 4B, 4C, and 4D are views illustrating a call connection using a phone number link tag in a message and a recent call list according thereto according to various embodiments of the present disclosure.

Figure 4A:
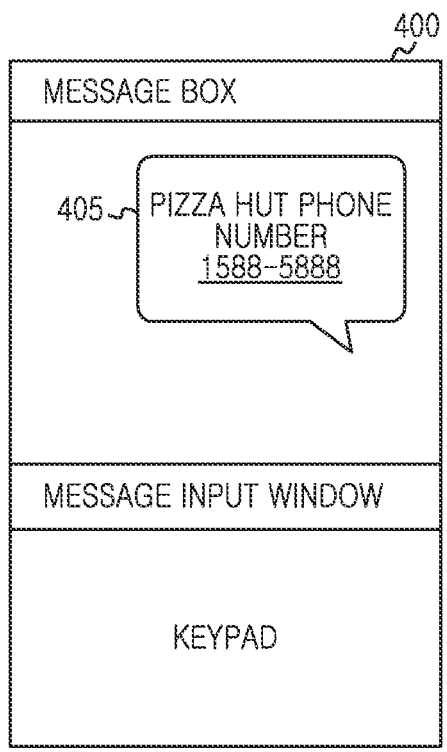
FIGS. 4A, 4B, 4C, and 4D are views illustrating a call connection using a phone number link tag in a message and a recent call list according thereto according to various embodiments of the present disclosure.

Referring to FIG. 4, a screen 400 of FIG. 4A is a screen of receiving a Pizza Hut phone number from another party during message transmission through a message application. If the Pizza Hut phone number "1588-5888" 415 of a link tag 405 is selected by a user of an electronic device, then, as shown in a screen 410 of FIG. 4B, a phone call application may provide a call connection to "1588-5888" 415. In the call connection screen 410 of FIG. 4B, an outgoing phone number (e.g., 1588-5888) 415, party image information 417 relating to the dialed number, a plurality of function keys 419, and/or the like may be provided. If the other party image is not registered, a default image is provided, and the plurality of function keys are soft keys for end call, call recording, keypad, and call sound mute.

Figure 4B:
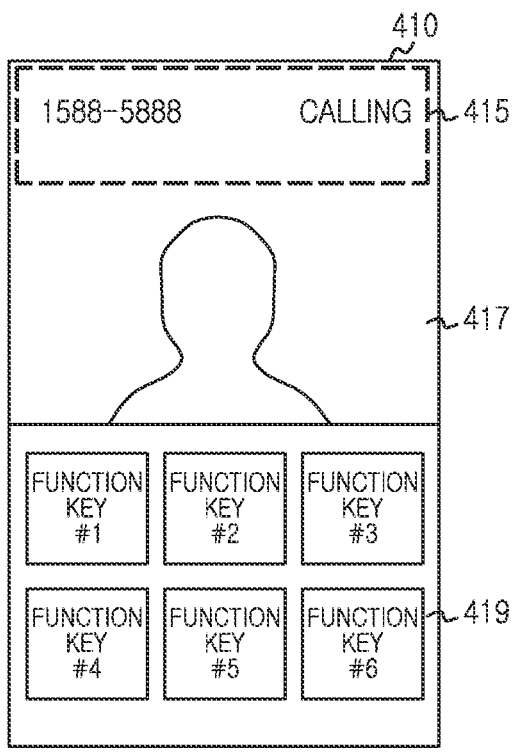
Figure 4C:

According to various embodiments of the present disclosure, simultaneously (or contemporaneously) with a call connection procedure, as shown in a screen 420 of FIG. 4C, the other part information corresponding to an incoming phone number (e.g., 1588-5888) 415 may be extracted by parsing SMS, MMS, an instant message, a SNS message, and/or the like. At this point, an extracted text may be used as the phone number name relating to the dialed number. For example, a word "Pizza Hut" related to the phone number "1588-5888" may be extracted from a corresponding message. According to various embodiments of the present disclosure, part of the text excluding a phone number may be extracted. For example, the Pizza Hut phone number may be extracted, and the number of extracted characters may be limited.

Figure 6:
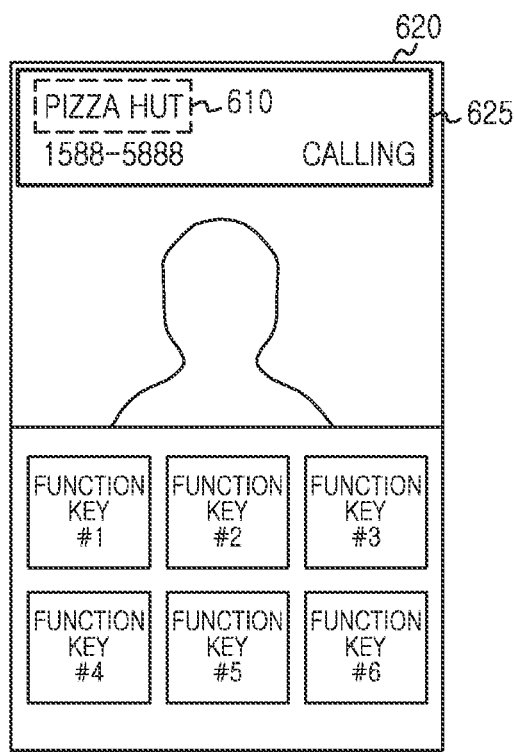
FIG. 6 is a view illustrating a call connection using a phone number link tag in a message and a recent call list according thereto according to various embodiments of the present disclosure.

According to various embodiments of the present disclosure, the other party information corresponding to the phone number (e.g., 1588-5888) of FIG. 4C may be displayed on the call connection screen 410 of FIG. 4B during a call connection. For example, as shown in FIG. 6, extracted information may be displayed during a call connection.

Although not shown in the drawing, in addition to a phone number, a related image, URL information and/or the like may be additionally received from the other party. According to various embodiments of the present disclosure, an image related to a phone number and URL information may be used as detailed information of the phone number "1588-5888". For example, an image may be added to an image area of detailed information of a phone number. According to various embodiments of the present disclosure, information such as an E-mail and a messenger may be parsed from a message. According to various embodiments of the present disclosure, an image may use a message capture image.

Figure 4D:
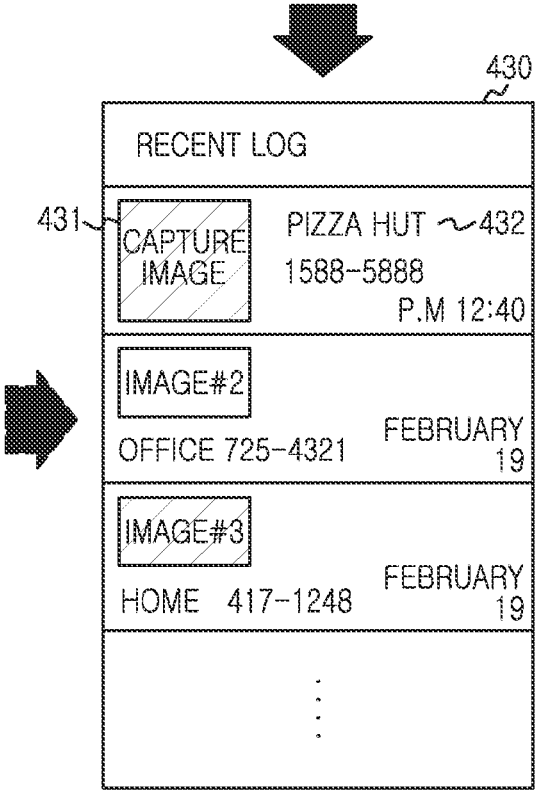

If the call connection is terminated, then, as shown in a screen 430 of FIG. 4D, call connection contents 431 and 432 of 1588-5588 may be recorded in a call log list. According to various embodiments of the present disclosure, the other party information related to the phone number "1588-5588" extracted from the screen 420 of FIG. 4C (e.g., "Pizza Hut"), may be automatically set as a representative name 432 of the phone number "1588-5588" Additionally, a message capture image or an image transmitted by another user may be used as an image 431 of the phone number "1588-5588".

FIG. 5 is a view illustrating information corresponding to a phone number when a call connection is made using a phone number link tag in a webpage according to various embodiments of the present disclosure.

Referring to FIG. 5, in a call connection screen 520, an outgoing or dialed phone number (e.g., 1588-5888) 525, a plurality of function keys 511, and/or the like may be provided. The other party image may be a capture image of an entire or part of a specific homepage extracted from, for example, the screen 320 of FIG. 3C or a specific image in a specific homepage, and a plurality of function keys may be soft keys for call end, call recording, keypad, call sound mute, and/or the like. Furthermore, a text 513 extracted from a combination of the webpage title 322 and the search word 323 may be displayed during a call with the outgoing phone number (e.g., 1588-5888).

FIG. 6 is a view illustrating information corresponding to a phone number when a call connection is made using a phone number link tag in a message according to various embodiments of the present disclosure.

Referring to FIG. 6, in a call connection screen 620, an outgoing phone number (e.g., 1588-5888) 625, a representative name 610 (e.g., a name of the party associated with the phone number, or the like), the other party information, a plurality of function keys 511, and/or the like may be provided.

The other party image may be an image received from another user through a message or a message capture image of FIG. 4A and the plurality of function keys may be soft keys for end call, call recording, keypad, call sound mute, and/or the like.

Figure 7A:
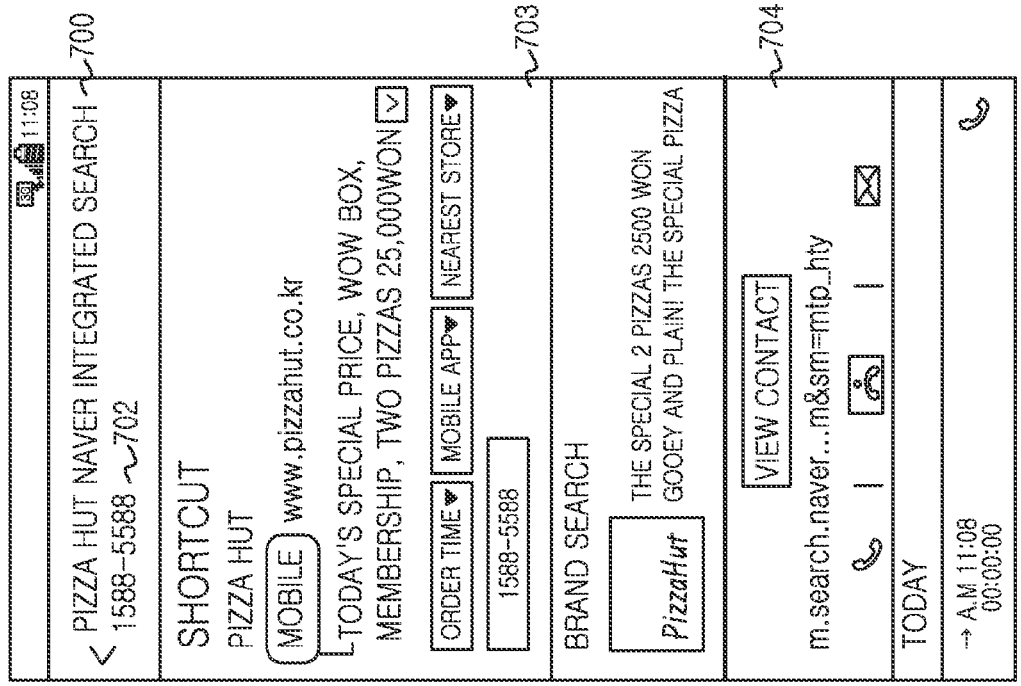
FIGS. 7A and 7B are views illustrating detailed information of a call log according to various embodiments of the present disclosure.
Figure 7B:
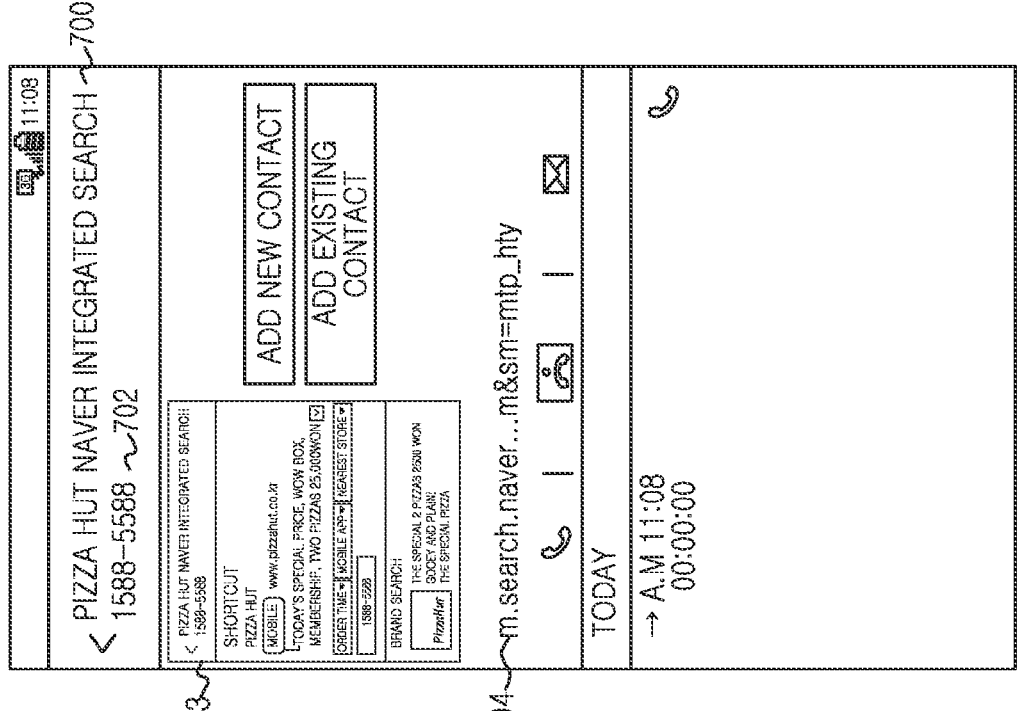

FIGS. 7A and 7B are views illustrating detailed information of a call log according to various embodiments of the present disclosure.

Referring to FIGS. 7A and 7B, detailed information on a specific item in contact information is illustrated. The specific item may correspond to one contact information associated with which a phone number name, an image, a URL, and/or the like are registered in a call list by extracting information from a corresponding content when a call connection is attempted through call identifier information such as, for example, the extracting of information illustrated in FIG. 3 or FIG. 4.

For example, the specific item may be configured to include at least one of a name 700, a phone number 702, an image 703, a URL 704, and/or the like.

According to various embodiments of the present disclosure, the name 700 of the specific item may be determined from a webpage title and/or a search word or may be determined from a text extracted through message parsing. According to various embodiments of the present disclosure, the image 703 of the specific item 703 may be determined from a capture image of an entire or part of a webpage or determined from a specific image in a webpage or determined from a message capture image or an image received through a message. The URL 704 of the specific item may be a URL related to a phone number or a webpage address through which the phone number 702 is obtained. According to various embodiments of the present disclosure, the URL 704 of the specific item may indicate information of an application (e.g., a message application) through which a phone number is obtained.

If necessary, the image 703 of the specific item may be enlarged as shown in FIG. 7B.

Figure 8:
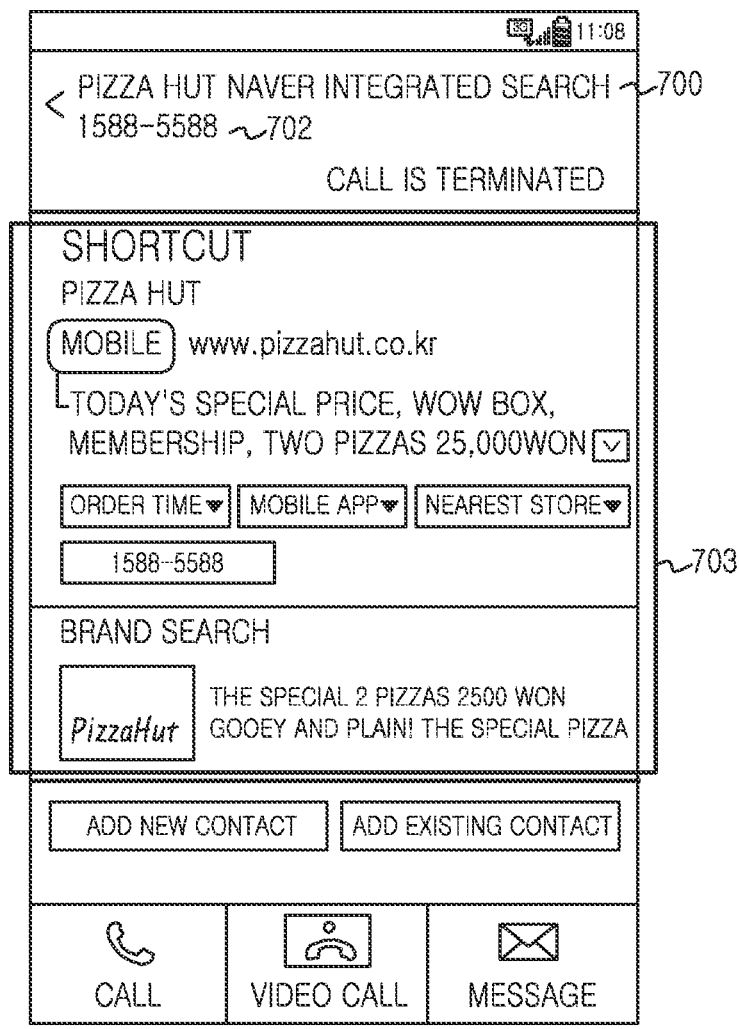
FIG. 8 is a view illustrating a call end screen according to various embodiments of the present disclosure.

FIG. 8 is a view illustrating a call end screen according to various embodiments of the present disclosure.

Referring to FIG. 8, as shown in FIG. 3 or FIG. 4, when a call connection is attempted through call identifier information, phone number information from content (e.g., a webpage and an instant message) may be obtained and such phone number information may be provided after a call connection is terminated. For example, if a call connection is terminated, the name 700, the phone number 702, the image 703, and/or the like may be displayed.

Figure 9:
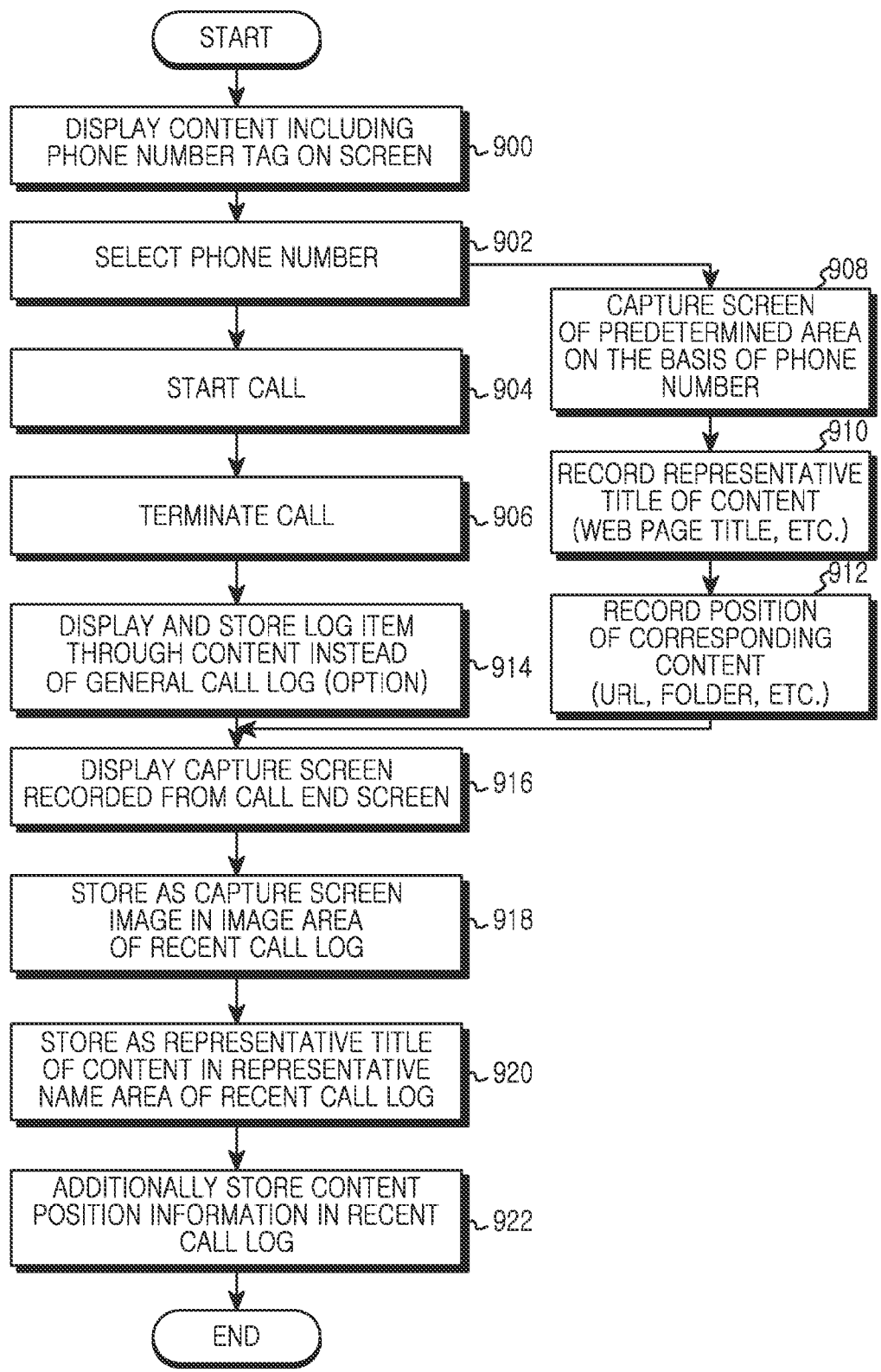
FIG. 9 is a flowchart for providing a call log in an electronic device according to various embodiments of the present disclosure.

FIG. 9 is a flowchart for providing a call log in an electronic device according to various embodiments of the present disclosure.

Referring to FIG. 9, at operation 900, the electronic device may display a content including call identifier information (e.g., a phone number, an E-mail address, SNS account information, and/or the like) on a screen. For example, a webpage or message including call identifier information may be displayed.

Thereafter, at operation 902, the electronic device detects whether the call identifier information in the content is selected.

At operation 904, the electronic device attempts a phone call connection if the electronic device detected a selection of the call identifier information in the content. For example, at operation 904, the electronic device starts a call using the call identifier information.

Thereafter, at operation 906, the phone call connection may be terminated.

According to various embodiments of the present disclosure, if a call connection is performed through a linked phone number while information on a restaurant or a hotel is confirmed in a search site, a Blog, or a message, in order to notify a user of which place a corresponding phone number indicates, the following information may be collected from a corresponding webpage, message, and/or the like.

Accordingly, at operation 908, an image for phone number is generated by capturing a screen of a predetermined area of a webpage or capturing a screen of an entire webpage on the basis of the phone number. Alternatively, a related image may be obtained by capturing a message or through a message.

Thereafter, at operation 910, the name of a phone number may be determined from a webpage title, a search word, or a combination of a webpage title and a search word. Alternatively, the name of a phone number may be extracted by parsing a message. For example, at operation 910, the electronic device may record a representative title of content (e.g., a web page title and/or the like).

At operation 912, the electronic device records the position of a corresponding content. For example, if a phone number is obtained from a webpage, then the electronic device determines the URL of the webpage from which the phone number is obtained or the URL related to the phone number. According to various embodiments of the present disclosure, if a phone number is obtained through message parsing, then the electronic device may record information of a folder storing a message.

The image captured at operation 908 may be used as image information of a phone number and this may be obtained through a screen capture or a message. According to various embodiments of the present disclosure, various capturing methods may be used to capture the image. An entire screen may be captured. However, if an entire screen capture image is stored in a small image area of a phone number, readability of the entire screen capture image drops significantly. Accordingly, capturing only some areas of content (e.g., a webpage) may be desirable. For example, when call identifier information is touched, a predetermined area is captured based on a touch point. According to various embodiments of the present disclosure, the predetermined area may be set in consideration of the size of a thumbnail image displayed on a phone book or a call list. According to various embodiments of the present disclosure, the predetermined area may be set by analyzing a homepage frame or title information or parsing a text, a highly relevant part to a phone number may be searched and then a corresponding part may be captured.

The position information of a corresponding content recorded at operation 912 may be the URL of a homepage related to a phone number or the URL of a homepage where a phone number is obtained. According to various embodiments of the present disclosure, the position information may be a folder containing a content of an application (e.g., a message application) related to a phone number. For example, if the position information is registered in a call list through a message including call identifier information, a content position becomes a corresponding message so that a message including call identifier information may be displayed if the content position is selected.

The text information recorded at operation 910 may be displayed as the name of a phone number. According to various embodiments of the present disclosure, instead of displaying a name, an unregistered phone number may be repeatedly displayed in an area.

According to various embodiments of the present disclosure, various methods of extracting a representative text may be implemented. In general, a content title (e.g., a webpage title or a message title) may be used as a phone number name. According to various embodiments of the present disclosure, if a phone number is searched from a search site through a search word, then the search word may be used as a phone number name.

If necessary, because a webpage title and a search word are combined and displayed as a webpage name, the combination of the webpage title and the search word may be used as the name of a phone number.

According to various embodiments of the present disclosure, by parsing texts of content and using important information such as repeatability, proximity, an important sign, and a position, the relevance to a phone number is determined and a text may be extracted.

At operation 914, the electronic device may display and store a call log item through content. For example, with respect to a phone number unregistered in contact information, a default image may be shown in an image area after call termination, and a general call log displaying a phone number may be displayed in a phone number area, and by extracting information (e.g., an image, a URL, a text, and/or the like) for identifying a phone number from content, an item for recording a call log may be additionally displayed in the phone number name area.

Thereafter, at operation 916, the electronic device displays an image/representative name/position information (hereinafter, referred to as identifier information) of a phone number obtained from content captured and/or recorded at operation 908 to operation 912 (see FIG. 8).

At operation 918, the electronic device stores a capture screen image or an obtained image in an image area during call log recording.

At operation 920, the electronic device stores text information extracted at operation 910 in a name area of a phone number.

At operation 922, the electronic device additionally stores the position information (e.g., a URL and a message folder) of content (see FIG. 7A and FIG. 7B).

As mentioned above, a call connection is made through a phone number link in a webpage and after a call termination, as shown in FIG. 9, phone number identifier information extracted from a webpage is displayed on a call end screen, such that what kind of information is stored to identify a phone number may be displayed to a user.

Figure 10:
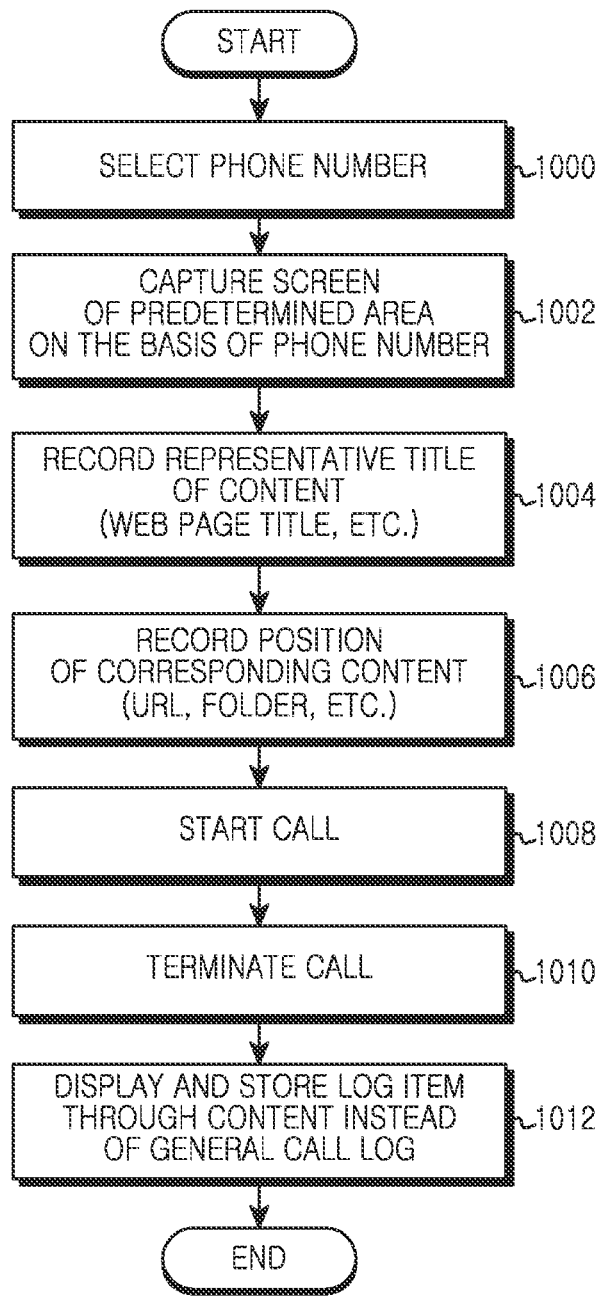
FIG. 10 is a flowchart for providing a call log in an electronic device according to various embodiments of the present disclosure.

FIG. 10 is a flowchart for providing a call log in an electronic device according to various embodiments of the present disclosure.

Referring to FIG. 10, at operation 1000, the electronic device may display a content including call identifier information on a screen. For example, a webpage or message including call identifier information may be displayed. The electronic device may detect whether call identifier information is selected. For example, the electronic device may detect whether a phone number is selected from the displayed content.

If a call connection is performed through a linked phone number while information on a restaurant or a hotel is confirmed in a search site, a Blog, or a message, in order to notify a user of which place a corresponding phone number indicates, the following information may be collected from a corresponding webpage or message.

At operation 1002, an image for the phone number is generated by capturing a screen of a predetermined area of a webpage or capturing a screen of an entire webpage on the basis of the phone number. According to various embodiments of the present disclosure, a related image may be obtained by capturing a message or through a message.

At operation 1004, the name of a phone number may be determined from a webpage title, a search word, or a combination of a webpage title a search word, and/or the like. According to various embodiments of the present disclosure, a text may be extracted by parsing a message. For example, at operation 1004, the electronic device may record a representative title of content (e.g., a web page title and/or the like).

At operation 1006, the electronic device records the position of a corresponding content. For example, if a phone number is obtained from a webpage, then the electronic device determines the URL of the webpage from which the phone number is obtained or the URL related to the phone number is determined. According to various embodiments of the present disclosure, if a phone number is obtained through message parsing, then the electronic device may record information of a folder storing a message.

The image captured at operation 1002 may be used as image information of a phone number and this may be obtained through a screen capture or a message. According to various embodiments of the present disclosure, various capturing methods may be used to capture the image. An entire screen may be captured. However, if an entire screen capture image is stored in a small image area of a phone number, readability of the entire screen capture image drops significantly. Accordingly, capturing only some areas of content (e.g., a webpage) may be desirable. For example, when call identifier information is touched, a predetermined area is captured based on a touch point. According to various embodiments of the present disclosure, the predetermined area may be set in consideration of the size of a thumbnail image displayed on a phone book or a call list. According to various embodiments of the present disclosure, the predetermined area may be set by analyzing a homepage frame or title information or parsing a text, a highly relevant part to a phone number may be searched and then a corresponding part may be captured.

The position information of a corresponding content recorded at operation 1006 may be the URL of a homepage related to a phone number or the URL of a homepage where a phone number is obtained. According to various embodiments of the present disclosure, the position information may be a folder containing a content of an application (e.g., a message application) related to a phone number. For example, if the position information is registered in a call list through a message including call identifier information, a content position becomes a corresponding message so that a message including call identifier information may be displayed if the content position is selected.

The text information recorded at operation 1004 may be displayed as the name of a phone number. According to various embodiments of the present disclosure, instead of displaying a name, an unregistered phone number may be repeatedly displayed in an area.

According to various embodiments of the present disclosure, various methods of extracting a representative text may be implemented. In general, a content title (e.g., a webpage title or a message title) may be used as a phone number name. According to various embodiments of the present disclosure, if a phone number is searched from a search site through a search word, then the search word may be used as a phone number name.

If necessary, because a webpage title and a search word are combined and displayed as a webpage name, the combination of the webpage title and the search word may be used as the name of a phone number.

According to various embodiments of the present disclosure, by parsing texts of content and using important information such as repeatability, proximity, an important sign, and a position, the relevance to a phone number is determined and a text may be extracted.

At operation 1008, the electronic device attempts a call connection to make a call. The electronic device may display information captured and/or recorded at operation 1002 to operation 1006, an image/representative name/position information (hereinafter, referred to as identifier information) of a phone number obtained from content may be displayed on a screen during a call.

At operation 1010, the electronic device terminates the call.

At operation 1012, after the call termination, the electronic device may display and store a call log item through content. For example, with respect to a phone number unregistered in contact information, a default image may be shown in an image area after call termination, and a general call log displaying a phone number may be displayed in a phone number area, and by extracting information (e.g., an image, a URL, text, and/or the like) for identifying a phone number from content, an item for recording a call log may be additionally displayed in the phone number name area.

Figure 11:
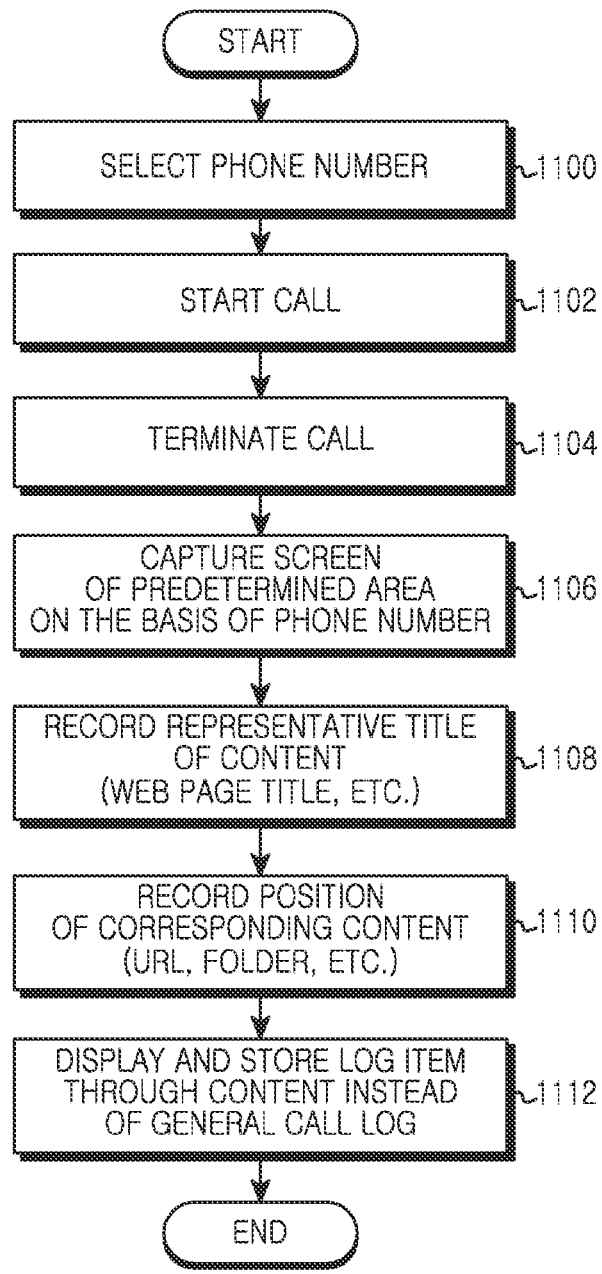
FIG. 11 is a flowchart for providing a call log in an electronic device according to various embodiments of the present disclosure.

FIG. 11 is a flowchart for providing a call log in an electronic device according to various embodiments of the present disclosure.

Referring to FIG. 11, at operation 1100, the electronic device may display a content including call identifier information on a screen \. For example, a webpage or message including call identifier information may be displayed. The electronic device may detect whether call identifier information is selected. For example, the electronic device may detect whether a phone number is selected from the displayed content.

At operation 1102, the electronic device may attempt a phone call connection if the electronic device determines that the call identifier information in content is selected.

At operation 1104, the phone call connection may be terminated.

Moreover, if a call connection is performed through a linked phone number while information on a restaurant or a hotel is confirmed in a search site, a Blog, or a message, in order to notify a user of which place a corresponding phone number indicates, the following information may be collected from a corresponding webpage or message.

At operation 1106, an image for the phone number is generated by capturing a screen of a predetermined area of a webpage or capturing a screen of an entire webpage on the basis of the phone number. According to various embodiments of the present disclosure, a related image may be obtained by capturing a message or through a message.

At operation 1108, the name of a phone number may be determined from a webpage title, a search word, or a combination of a webpage title, a search word, and/or the like. According to various embodiments of the present disclosure, a text may be extracted by parsing a message. For example, at operation 1108, the electronic device may record a representative title of content (e.g., a web page title and/or the like).

At operation 1110, the electronic device records the position of a corresponding content. For example, if a phone number is obtained from a webpage, then the electronic device determines the URL of the webpage from which the phone number is obtained or the URL related to the phone number is determined. According to various embodiments of the present disclosure, if a phone number is obtained through message parsing, then the electronic device may record information of a folder storing a message.

The image captured at operation 1106 may be used as image information of a phone number and this may be obtained through a screen capture or a message. According to various embodiments of the present disclosure, various capturing methods may be used to capture the image. An entire screen may be captured. However, if an entire screen capture image is stored in a small image area of a phone number, readability of the entire screen capture image drops significantly. Accordingly, capturing only some areas of content (e.g., a webpage) may be desirable. For example, when call identifier information is touched, a predetermined area is captured based on a touch point. According to various embodiments of the present disclosure, the predetermined area may be set in consideration of the size of a thumbnail image displayed on a phone book or a call list. According to various embodiments of the present disclosure, the predetermined area may be set by analyzing a homepage frame or title information or parsing a text, a highly relevant part to a phone number may be searched and then a corresponding part may be captured.

The position information of a corresponding content recorded at operation 1112 may be the URL of a homepage related to a phone number or the URL of a homepage where a phone number is obtained. According to various embodiments of the present disclosure, the position information may be a folder containing a content of an application (e.g., a message application) related to a phone number. For example, if the position information is registered in a call list through a message including call identifier information, a content position becomes a corresponding message so that a message including call identifier information may be displayed if the content position is selected.

The text information recorded at operation 1110 may be displayed as the name of a phone number. According to various embodiments of the present disclosure, instead of displaying a name, an unregistered phone number may be repeatedly displayed in an area.

According to various embodiments of the present disclosure, various methods of extracting a representative text may be implemented. In general, a content title (e.g., a webpage title or a message title) may be used as a phone number name. According to various embodiments of the present disclosure, if a phone number is searched from a search site through a search word, then the search word may be used as a phone number name.

If necessary, because a webpage title and a search word are combined and displayed as a webpage name, the combination of the webpage title and the search word may be used as the name of a phone number.

According to various embodiments of the present disclosure, by parsing texts of content and using important information such as repeatability, proximity, an important sign, and a position, the relevance to a phone number is determined and a text may be extracted.

At operation 1112, the electronic device may display and store a call log item through content. For example, with respect to a phone number unregistered in contact information, a default image may be shown in an image area after call termination, and a general call log displaying a phone number may be displayed in a phone number area, and by extracting information (e.g., an image, a URL, text, and/or the like) for identifying a phone number from content, an item for recording a call log may be additionally displayed in the phone number name area.

Figure 12:
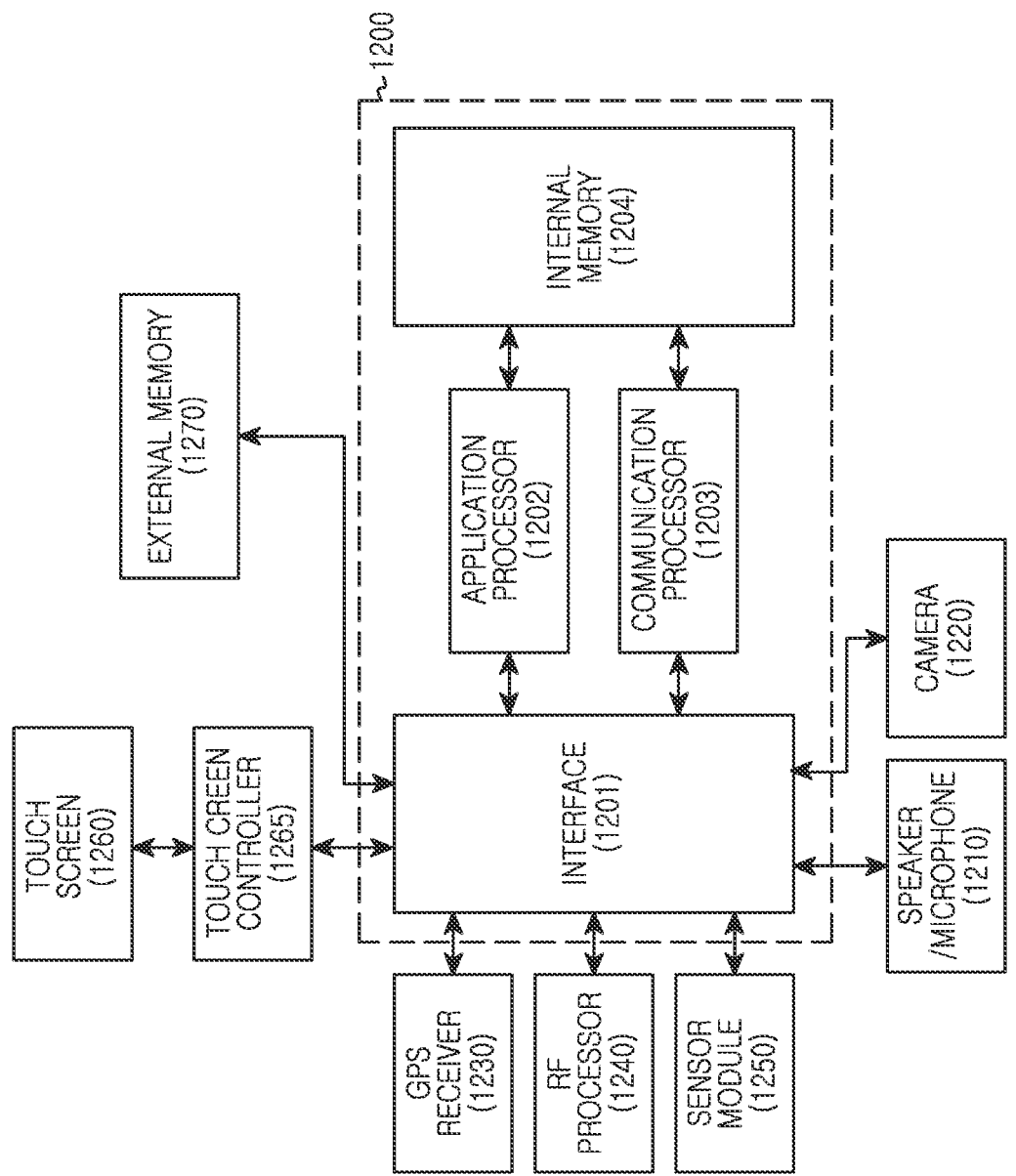
FIG. 12 is a view illustrating a configuration of an electronic device according to an embodiment of the present disclosure.

FIG. 12 is a view illustrating a configuration of an electronic device according to various embodiments of the present disclosure.

Referring to FIG. 12, the electronic device is configured including a controller 1200, a speaker/microphone 1210, a camera 1220, a GPS receiver 1230, an RF processor 1240, a sensor module 1250, a touch screen 1260, a touch screen controller 1265, and an external memory 1270.

The controller 1200 includes an interface 1201, one or more processors (e.g., Application Processor (AP) 1202 and Communication Processor (CP) 1203), and an internal memory 1204. If necessary, the entire controller 1200 may be referred to as a processor. The interface 1201, the application processor 1202, the communication processor 1203, and the internal memory 1204 may be separate components or may be integrated into one circuit.

The AP 1202 performs various functions for the electronic device by executing various software programs and the CP 1203 performs processing and control operations for voice communication and data communication. Additionally, in addition to such a typical function, the AP 1202 and/or the CP 1203 may execute a specific software module (e.g., an instruction set) stored in the external memory 1270 or the internal memory 1204 so as to perform specific various functions corresponding to the specific software module. For example, the AP 1202 and the CP 1203 perform methods according to various embodiments of the present disclosure in connection with software modules stored in the external memory 1270 or the internal memory 1204. According to various embodiments of the present disclosure, the AP 1202 may perform a method for providing the call log described with reference to FIGS. 9 to 11.

For example, the AP 1202 may operatively display a content including call identifier information on a screen, detect whether the call identifier information in the content is selected, attempt a phone call connection when a phone number tag is selected, and terminate the phone call connection.

Moreover, the AP 1202 may generate an image for phone book by capturing a screen of a predetermined area of a webpage or capturing a screen of an entire webpage on the basis of the phone number. According to various embodiments of the present disclosure, the AP 1202 may obtain a related image by capturing a message or through a message.

The AP 1202 may determine the name of a phone number, from a webpage title, a search word, or a combination of a webpage title and a search word. The AP 1202 may extract the name of the phone number by parsing a message.

The AP 1202 may record a position of a corresponding content. For example, if a phone number is obtained from a webpage, the URL of the webpage where the phone number is obtained or the URL related to the phone number is determined. According to various embodiments of the present disclosure, if a phone number is obtained through message parsing, then the AP 1202 may record information of a folder storing a message.

Furthermore, the AP 1202 may display and store a call log item through content, display an image/representative name/position information of a phone number obtained from the content on a call end screen (see FIG. 8), store a capture screen image or obtained image in an image area during call log recording, store extracted text information in a name area of the phone number, and include an instruction for additionally storing the position information (e.g., a URL and a message folder) of the content (see FIG. 7A and FIG. 7B).

According to various embodiments of the present disclosure, the AP 1202 may display a content including call identifier information on a screen. For phone number identification information, an image for phone number may be generated by capturing a screen of a predetermined area of a webpage or by capturing a screen of an entire webpage on the basis of the phone number. According to various embodiments of the present disclosure, the AP 1202 may obtain a related image by capturing a message or through a message. According to various embodiments of the present disclosure, the AP 1202 may determine the name of a phone number from a webpage title, a search word, or a combination of a webpage title and a search word. The AP 1202 may extract the name of the phone number by parsing a message. The AP 1202 may record the position of a corresponding content. For example, if a phone number is obtained from a webpage, the URL of the webpage where the phone number is obtained or the URL related to the phone number is determined. According to various embodiments of the present disclosure, if a phone number is obtained through message parsing, then the AP 1202 may record information of a folder storing a message.

Additionally, the AP 1202 may attempt a call connection to make a call. At this point, the AP 1202 may obtain an image/representative name/position information (hereinafter, referred to as identifier information) of a phone number from content that may be displayed on a screen during a call.

The interface 1201 is connected to the touch screen controller 1265 and the external memory 1270 of the electronic device.

The sensor module 1250 may be operatively coupled to the interface 1201 to allow various functions. For example, a motion sensor and an optical sensor may be coupled to the interface 1201 so that the electronic device may detect a motion of each electronic device and light from the outside. In addition or in the alternative, other sensors such as a positioning system, a temperature sensor, a bio sensor, and/or the like may be connected to the interface 1201 to perform related functions.

The camera 1220 may perform a camera function such as picture capture and video clip recording in combination with the sensor module 1250 through the interface 1201.

The RF processor 1240 performs a communication function. For example, under a control of the CP 1203, an RF signal is converted into a baseband signal and then provided to the CP 1203, or a baseband signal from the CP 1203 is converted into an RF signal and then transmitted. According to various embodiments of the present disclosure, the CP 1203 processes a baseband signal through various communication methods. For example, the communication methods may include a Global System for Mobile Communication (GSM) method, an Enhanced Data GSM Environment (EDGE) communication method, a Code Division Multiple Access (CDMA) communication method, a W-Code Division Multiple Access (W-CDMA) communication network, a Long Term Evolution (LTE) communication network, an Orthogonal Frequency Division Multiple Access (OFDMA) communication method, a Wireless Fidelity (WiFi) communication method, a WiMax communication method, a Bluetooth communication method, a WiFi Direct communication method, a Near Field Communications (NFC) communication method. However, various embodiments of the present disclosure are not limited thereto.

The speaker/microphone 1210 may be responsible for an input and output of audio stream such as voice recognition, voice copy, digital recording, phone functions, and/or the like. For example, the speaker/microphone 1210 converts a voice signal into an electrical signal or convert an electrical signal into a voice signal. Although not shown in the drawings, an attachable and detachable ear phone, head phone, or head set may be connected to an electronic device through an external port.

The touch screen controller 1265 may be coupled to the touch screen 1260. The touch screen 1260 and the touch screen controller 1265 are not limited to the above, and may detect a contact, movement, or stop through an arbitrary multi touch detection technology including other proximity sensor arrangements or other components in addition to capacitive, resistive, infrared surface acoustic wave technologies, and/or the like for determining at least one contact point on the touch screen 1260.

The touch screen 1260 provides an input/output interface between the electronic device and a user. For example, the touch screen 1260 delivers a user touch input to the electronic device. Additionally, the touch screen 1260 is a medium displaying an output from the electronic device to a user. For example, the touch screen 1260 displays a visual output to a user. Such a visual output includes text, graphic, video, combinations thereof, and/or the like.

The touch screen 1260 may include various displays. For example, the touch screen 1260 is not limited to the above, and may include liquid crystal display (LCD), Light Emitting Diode (LED), light emitting polymer display (LPD), Organic Light Emitting Diode (OLED), Active Matrix Organic Light Emitting Diode (AMOLED), Flexible LED (FLED), and/or the like.

The GPS receiver 1230 converts signals from satellites into information, for example, position, speed, and time. For example, the distance between a satellite and the GPS receiver 1230 may be calculated by multiplying the speed of light and a signal arrival time and the position of an electronic device is measured by obtaining the accurate positions and distances of three satellites through the well-known principle of triangulation.

The external memory 1270 or the internal memory 1204 may include at least one magnetic disk storage device, at least one high-speed random access memory and/or nonvolatile memory, at least one optical storage device and/or flash memory (e.g., NAND and NOR), and/or the like.

The external memory 1270 or the internal memory 1204 stores software. The software component includes an operating system software module, a communication software module, a graphic software module, a user interface software module, an MPEG module, a camera software module, and at least one application software module. Additionally, modules, (e.g., software components), may be expressed in a set of instructions and thus, may be referred to as an instruction set. The modules may be expressed in programs.

The operating system software may include various software components controlling general system operations. The control of such general system operations means memory management and control, storage hardware (device) control and management, and power control and management, for example. Such operating system software performs a function allowing smooth communication between various hardware (e.g., devices) and various software components (e.g., modules).

The communication software module may allow communication with other electronic devices such as computers, servers, and/or portable terminals through the RF processor 1240. The communication software module is configured with a protocol structure corresponding to a corresponding communication method.

The graphic software module provides graphics on the touch screen 1260 and includes various software components for display. The term "graphics" may include text, webpage, icon, digital image, video, and animation.

The user interface software module includes various software components relating to a user interface. The user interface software module includes contents on how a state of a user interface is changed or under what condition a state of a user interface is changed.

The camera software module includes a camera related software component for performing camera related processes and functions. The application module may include a browser function, an email function, an instant message function, a word processing function, a keyboard emulation function, an address book function, a touch list function, a widget function, a Digital Right Management (DRM) function, a voice recognition function, a voice copy function, a position determining function, and a location based service. The memories 1270 and 1204 may include additional modules (or instructions) in addition to the above-mentioned modules. According to various embodiments of the present disclosure, if necessary, some modules (or instructions) may not be used.

In relation to various embodiments of the present disclosure, an instruction providing a call log is included. The instruction is included for performing operations described in relation to FIGS. 9 to 11.

For example, the application module displays a content including call identifier information on a screen, detects whether the call identifier information in the content is selected, attempts a phone call connection when the call identifier information is selected, and includes an instruction for terminating the phone call connection.

Moreover, the application module generates an image for phone book by capturing a screen of a predetermined area of a webpage or capturing a screen of an entire webpage on the basis of the phone number. According to various embodiments of the present disclosure, a related image may be obtained by capturing a message or through a message.

The application module may determine the name of a phone number from a webpage title, a search word, or a combination of a webpage title and a search word. The application module may extract the name of the phone number by parsing a message.

The position of a corresponding content is recorded. For example, if a phone number is obtained from a webpage, the URL of the webpage where the phone number is obtained or the URL related to the phone number is determined. According to various embodiments of the present disclosure, if a phone number is obtained through message parsing, information of a folder storing a message may be recorded.

Furthermore, the application module displays and stores a call log item through content, displays an image/representative name/position information of a phone number obtained from the content on a call end screen (see FIG. 8), stores a capture screen image or obtained image in an image area during call log recording, stores extracted text information in a name area of the phone number, and includes an instruction for additionally storing the position information (e.g., a URL and a message folder) of the content (see FIG. 7A and FIG. 7B.

According to various embodiments of the present disclosure, the application module may display a content including call identifier information on a screen. For phone number identification information, an image for phone number is generated by capturing a screen of a predetermined area of a webpage or capturing a screen of an entire webpage on the basis of the phone number. According to various embodiments of the present disclosure, a related image may be obtained by capturing a message or through a message, and for the name of a phone number, a text is determined from a webpage title, a search word, or a combination of a webpage title and a search word. According to various embodiments of the present disclosure, a text (e.g., a name of the phone number) may be extracted by parsing a message and the position of a corresponding content is recorded. For example, if a phone number is obtained from a webpage, the URL of the webpage where the phone number is obtained or the URL related to the phone number is determined. According to various embodiments of the present disclosure, if a phone number is obtained through message parsing, information of a folder storing a message may be recorded.

Additionally, the application module attempts a call connection to make a call. At this point, an image/representative name/position information (hereinafter, referred to as identifier information) of a phone number obtained from content may be displayed on a screen during a call.

FIGS. 13A, 13B, 13C, and 13D are views illustrating mail transmission using an E-mail link tag in a webpage, for example, one of content, and a recent mail list according thereto according to various embodiments of the present disclosure.

Referring to FIGS. 13A, 13B, 13C, and 13D, a screen 1300 of FIG. 3A is a search result screen when a search word "Pizza Hut" is input and searched in a specific integrated webpage. According to various embodiments of the present disclosure, a Pizza Hut homepage address or E-mail address 1305 may be provided on a screen. According to various embodiments of the present disclosure, although not shown in the drawing, other contents (e.g., an image, a map, a cafe, and a blog) relating to the Pizza Hut in addition to the Pizza Hut homepage address or E-mail address may be further provided. Moreover, a Pizza Hut homepage address or E-mail address may be link-tagged.

For example, if the Pizza Hut E-mail address "receiver@samsung.com" 1305 of a link tag is selected by a user of an electronic device, as shown in an E-mail application screen 1310 of FIG. 13B, an E-mail application may provide E-mail transmission to receiver@samsung.com 1305.

For example, simultaneously (or contemporaneously) with an E-mail transmission procedure, as shown in a screen 1320 of FIG. 13C, the other party information corresponding to an E-mail address (e.g., "receiver@samsung.com") may be extracted from a specific homepage 1300. For example, the other party information may include at least one of a capture image 1321 of an entire or part of a specific homepage based on receiver@samsung.com, a webpage title 1322, a search word 1323, and a Uniform Resource Locator (URL) 1325 of a searched webpage, a phone number 1327. According to various embodiments of the present disclosure, the webpage title 1322 and the search word 1323 may be combined and processed as one text information. For example, the webpage title 1322 and the search word 1323 may be combined and processed as one text information that may be expressed as "Pizza Hut::Integrated search".

The capture image may be used for an image area 1321 of detailed information of an E-mail address (e.g., receiver@samsung.com) 1305. Some areas of a webpage mean predetermined areas based on a touch point when a mail writing application is performed through a touch operation of a mail address link tag. The predetermined areas may have the most appropriate size in consideration of the size of a thumbnail image displayed on a phone book or a call list. According to various embodiments of the present disclosure, through a method of analyzing a homepage frame or title information or parsing a text, the most relevant part to an E-mail address may be searched and then may be captured. According to various embodiments of the present disclosure, an image having a high relevant to a search word (e.g., Pizza Hut) may be selected from images included in the specific webpage 1300.

In addition to the URL of the searched webpage, a resolution of a screen displaying the searched webpage or a scroll position in a browser may be tagged and stored. The resolution of the screen displaying the searched webpage or a scroll position may be stored for moving to a specific position of a homepage related to the E-mail address (e.g., receiver@samsung.com) 1305 when a URL link corresponding to the E-mail address (e.g., receiver@samsung.com) 1305 is selected later.

The webpage title 1322 or the search word 1323 may be displayed on a name area in a call list. According to various embodiments of the present disclosure, instead of a phone number, a webpage title 1322, a search word 1323, or a text combining the webpage title 1322 and the search word 1323 may be displayed.

If the E-mail application is terminated, then, as shown in a screen 1330 of FIG. 13D, a mail transmission history 1333 for receiver@samsung.com may be recorded in a call log list. The other party information related to the receiver@samsung.com extracted from the screen 1320 of FIG. 13C, for example, the capture image 1321, the webpage title 1322, the search word 1323, and the URL 1325 of a searched webpage may be recorded and displayed.

FIGS. 14A, 14B, 14C, and 14D are views illustrating a message transmission using a phone number link tag in a webpage, for example, one of content, and a recent call list according thereto according to various embodiments of the present disclosure.

Figure 14A:
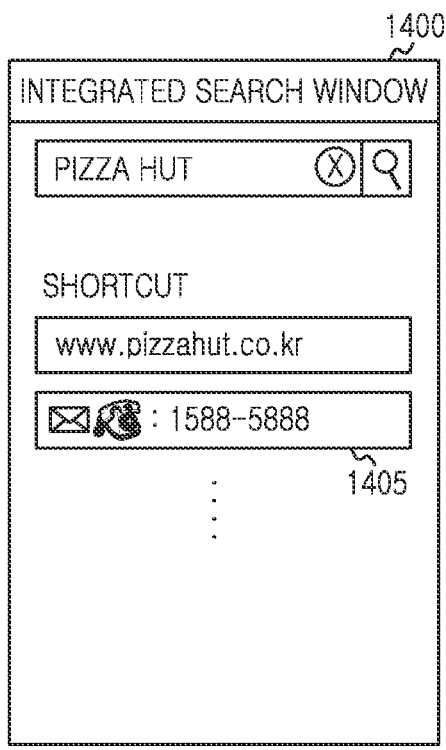
FIGS. 14A, 14B, 14C, and 14D are views illustrating a message transmission using a phone number link tag in a webpage, for example, one of content, and a recent call list according thereto according to various embodiments of the present disclosure.

Referring to FIGS. 14A, 14B, 14C and 14D, a screen 1400 of FIG. 14A is a search result screen when a search word "Pizza Hut" is input and searched in a specific integrated webpage. According to various embodiments of the present disclosure, a Pizza Hut homepage address or phone number 1405 may be provided to a screen. According to various embodiments of the present disclosure, although not shown in the drawing, other contents (e.g., an image, a map, a cafe, and a blog) relating to the Pizza Hut in addition to the Pizza Hut homepage address or phone number 1405 may be further provided. Moreover, a Pizza Hut homepage address or phone number may be link-tagged.

Figure 14B:
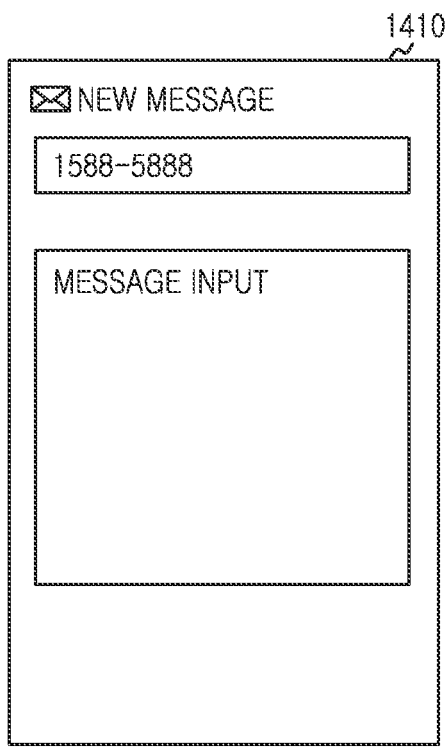

For example, if the Pizza Hut phone number "1588-5888" 1405 of a link tag is selected by a user of an electronic device, as shown in a message application screen 1410 of FIG. 14B, a message application may provide a message transmission to "1588-5888" 1405.

Figure 14C:
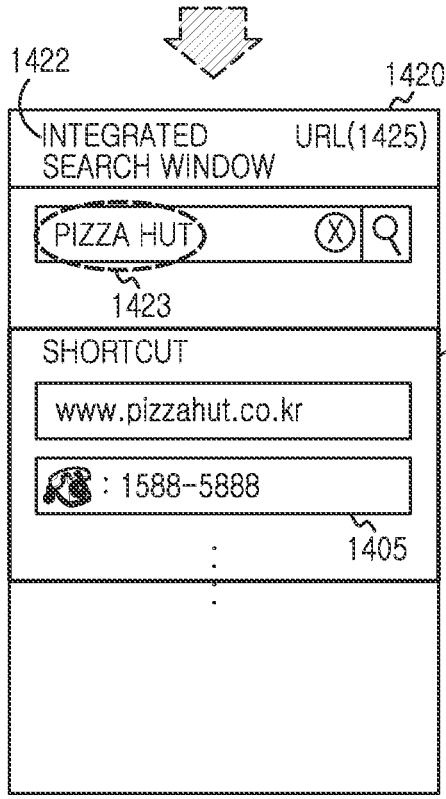

For example, simultaneously (or contemporaneously) with a message transmission procedure, as shown in a screen 1420 of FIG. 14C, the other party information corresponding to an outgoing phone number (e.g., 1588-5888) may be extracted from a specific homepage. For example, the other party information may include at least one of a capture image 1421 of an entire or part of a specific homepage based on a phone number link tag, a webpage title 1422, a search word 1423, a URL 1425 of a searched webpage, an email address (not shown), and/or the like. According to various embodiments of the present disclosure, the webpage title 1422 and the search word 1423 may be combined and processed as one text information. For example, the webpage title 1422 and the search word 1423 may be combined and processed as one text information so as to be expressed as "Pizza Hut::Integrated search".

The capture image may be used for an image area 1421 of detailed information of the outgoing phone number (e.g., 1588-5888) 1415. Some areas of a webpage mean predetermined areas based on a touch point when a call connection is performed through a touch operation of a phone number link tag. The predetermined areas may have the most appropriate size in consideration of the size of a thumbnail image displayed on a phone book or a call list. According to various embodiments of the present disclosure, through a method of analyzing a homepage frame or title information or parsing a text, the most relevant part to a phone number may be searched and then may be captured. According to various embodiments of the present disclosure, an image having a high relevant to a search word (e.g., Pizza Hut) may be selected from images included in the specific webpage 1400.

In addition to the URL of the searched webpage, a resolution of a screen displaying the searched webpage or a scroll position in a browser may be tagged and stored. The resolution of the screen displaying the searched webpage or a scroll position may be stored for moving to a specific position of a homepage related to the outgoing phone number (e.g., 1588-5888) 1415 when a URL link corresponding to the outgoing phone number (e.g., 1588-5888) 1415 is selected later.

The webpage title 1422 or the search word 1423 may be displayed on a name area in a call list. A number not registered to a phone number may be repeatedly displayed on a name area. According to various embodiments of the present disclosure, instead of displaying a phone number, the webpage title 1422, the search word 1423, or a text combining the webpage title 1422, and the search word 1423 may be displayed.

For example, because a corresponding search word and a webpage name are displayed on a webpage title area when a search word is input in a search site, the corresponding search word and the webpage name may be more likely to indicate to the user a relationship to a number to a corresponding phone number and may indicate to the user the reason that the user attempted a call connection to a corresponding number (e.g., a user is more likely to infer an intention for attempting the call connection to the corresponding number based on the information provided).

Figure 14D:
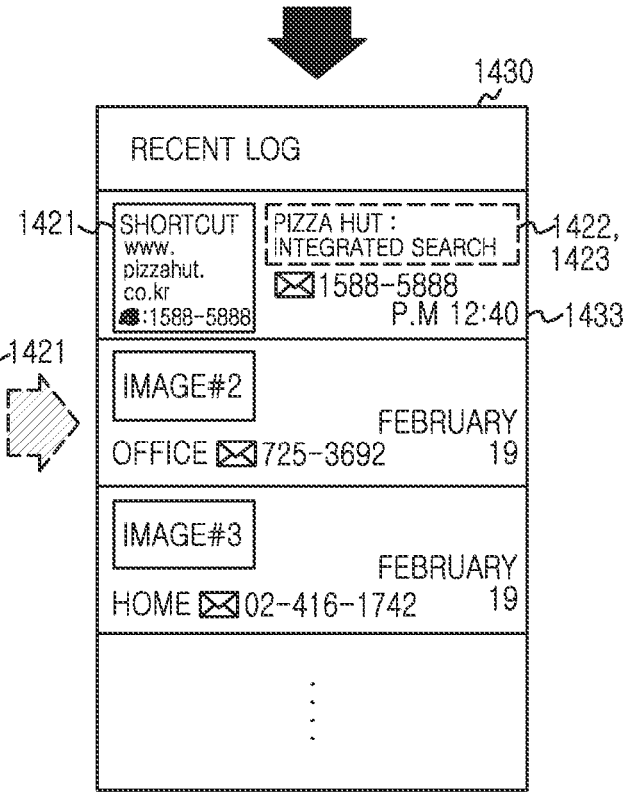

If the E-mail application is terminated, as shown in a screen 1430 of FIG. 14D, a message transmission history 1433 for the phone number 1588-5588 may be recorded in a call log list. The other party information related to the 1588-5588 number 1405 extracted from the screen 1420 of FIG. 14C, for example, the capture image 1421, the webpage title 1422, the search word 1423, and the URL 1425 of a searched webpage may be recorded and displayed.

Figure 15:
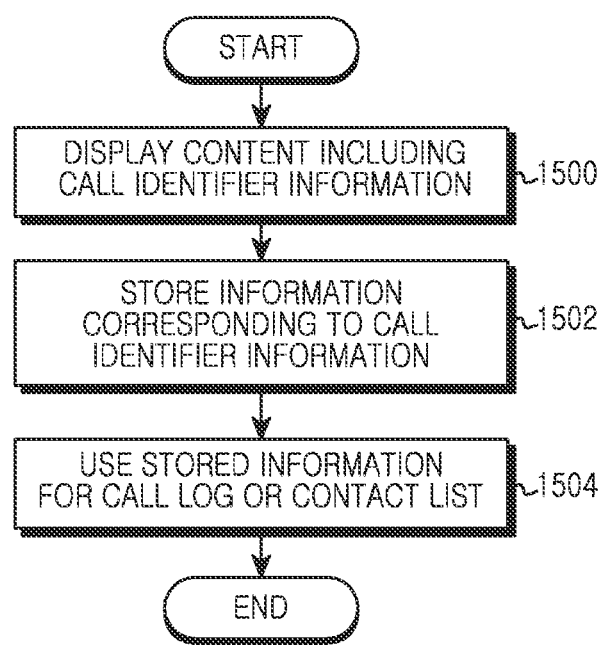
FIG. 15 is a flowchart for providing a call log in an electronic device according to various embodiments of the present disclosure.

FIG. 15 is a flowchart for providing a call log in an electronic device according to various embodiments of the present disclosure.

Referring to FIG. 15, at operation 1500, the electronic device may display a content including call identifier information.

At operation 1502, the electronic device stores information corresponding to the call identifier information from the content.

According to various embodiments of the present disclosure, an operation for storing information corresponding call identifier information from the content may include an operation for capturing an entire or part of a screen including the call identifier information and an operation for storing the captured screen as an image.

According to various embodiments of the present disclosure, an operation for storing information corresponding call identifier information from the content may include an operation for selecting at least one image related to the call identifier information from among images in the content including the call identifier information and an operation for storing the selected image.

According to various embodiments of the present disclosure, an operation for storing information corresponding call identifier information from the content may include an operation for extracting a text corresponding to a title or search word of the content and an operation for storing the extracted text.

According to various embodiments of the present disclosure, an operation for storing information corresponding call identifier information from the content may include an operation for extracting the URL or storage position of the content and an operation for storing the extracted information.

According to various embodiments of the present disclosure, an operation for storing information corresponding call identifier information from the content may include an operation for parsing the content, an operation for extracting a text related to the call identifier information on the basis of the parsing result, and an operation for storing the extracted text.

At operation 1504, the electronic device uses the stored information for a call log or contact list.

Various embodiments of the present disclosure may be implemented in hardware, software, or a combination thereof.

If the methods are implemented using software, a non-transitory computer readable recording medium storing at least one program (e.g., a software module) may be provided. At least one program stored in a non-transitory computer readable recording medium is configured for execution by at least one processor in an electronic device. At least one program includes instructions for executing, by an electronic device, the methods according to various embodiments listed in claims and/or specification of the present disclosure.

Such program (e.g., software modules and software) may be stored in random access memory, non-volatile memory including flash memory, Read Only Memory (ROM), Electrically Erasable Programmable Read Only Memory (EE-PROM), a magnetic disc storage device, Compact Disc-ROM (CD-ROM), Digital Versatile Discs (DVDs), or another form of an optical storage device, or a magnetic cassette. According to various embodiments of the present disclosure, such program may be stored in a memory configured with a combination of some or all of the above. Additionally, each configuration memory may be included in plurality.

Additionally, such program may be stored in an attachable storage device capable of accessing an electronic device through communication networks such as Internet, Intranet, Local Area Network (LAN), Wide LAN (WLAN), and Storage Area Network (SAN) or communication networks configured with combinations thereof. Such a storage device may access an electronic device through an external port.

Additionally, an additional storage device on a communication network may access a portable electronic device.

According to various embodiments of the present disclosure, in relation to a method of providing a call log in an electronic device during a call function, by storing information related to call tag information from a content including the call tag information and using the information, when a user confirms a call log, information on corresponding call tag information may be provided to a user.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
   receiving by a processor of the electronic device, a message including a call identifier information;
   attempting, by the processor, to initiate a call connection using the call identifier information in response to selection of the call identifier information;
   extracting, by the processor, a text from the message; and
   storing, by the processor, the extracted text as another party name for the call identifier information.

2. The method of claim 1, wherein the storing of the extracted text as the other party name relating to the call identifier information comprises:
   capturing at least one of an entire screen and a part of a screen on the message; and
   storing the captured screen as another party image relating to the call identifier information.

3. The method of claim 1, wherein the storing of the extracted text as the other party name relating to the call identifier information comprises:
   selecting at least one image from the message; and
   storing the selected image as another party image relating to the call identifier information.

4. The method of claim 1, wherein the receiving of the message including call identifier information comprises:
   receiving the message from the other party through a message application.

5. The method of claim 1, wherein the storing of the extracted text as the other party name relating to the call identifier information comprises:
    extracting a Uniform Resource Locator (URL) from the message; and
    storing the extracted URL as detailed information relating to the call identifier information.

6. The method of claim 1, wherein the extracting of the text from the message comprises:
    extracting a predetermined number of texts from the message.

7. The method of claim 1, further comprising:
    displaying the extracted text as the other party name and the call identifier information during the call connection.

8. The method of claim 1, further comprising:
    terminating the call connection; and
    displaying the extracted text as the other party name and the call identifier information.

9. The method of claim 1, wherein the storing of the extracted text as the other party name relating to the call identifier information comprises:
    storing the extracted text and the call identifier information as the other party information at least one of a call log and a contact list.

10. An electronic device comprising:
    at least one processor;
    a memory; and
    at least one program stored in the memory and configured to be executed by the at least one processor,
    wherein the at least one program comprises an instruction for receiving a message including a call identifier information, attempting to initiate a call connection using the call identifier information in response to selection of the call identifier information, extracting a text from the message, and storing the extracted text as another party name for the call identifier information.

11. The device of claim 10, wherein the instruction for storing the extracted text as the other party name relating to the call identifier information comprises an instruction for capturing at least one of an entire screen and a part of a screen on the message, and storing the captured screen as another party image relating to the call identifier information.

12. The device of claim 10, wherein the instruction for storing the extracted text as the other party name relating to the call identifier information comprises an instruction for selecting at least one image from the message and storing the selected image as another party image relating to the call identifier information.

13. The device of claim 10, wherein the instruction for receiving the message including the call identifier information comprises an instruction for receiving the message from the other party through a message application.

14. The device of claim 10, wherein the instruction for storing the extracted text as the other party name relating to the call identifier information comprises an instruction for extracting a Uniform Resource Locator (URL) from the message and storing the extracted URL as detailed information relating to the call identifier information.

15. The device of claim 10, wherein the instruction for extracting the text from the message comprises an instruction for extracting a predetermined number of texts from the message.

16. The device of claim 10, wherein the at least one program further comprises an instruction for displaying the extracted text as the other party name and the call identifier information during the call connection.

17. The device of claim 10, wherein the at least one program further comprises an instruction for terminating the call connection and displaying the extracted text as the other party name and the call identifier information.

18. The device of claim 10, wherein the instruction for storing the extracted text as the other party name relating to the call identifier information comprises an instruction for storing the extracted text and the call identifier information as the other party information at least one of a call log and a contact list.

19. A non-transitory computer-readable storage medium storing instructions that, when executed, cause at least one processor to:
    receive a message including a call identifier information;
    attempt to initiate a call connection using the call identifier information in response to selection of the call identifier information;
    extract a text from the message; and
    store the extracted text as another party name for the call identifier information.

20. A method for associating contact information with a contact in an electronic device, the method comprising:
    displaying a content including contact information;
    detecting a request to communicate with a contact associated with the displayed contact information;
    in response to detecting the request to communicate with the contact associated with the displayed contact information,
        determining whether the contact associated with the displayed contact information exists in a database of contacts; and
        storing information corresponding to the displayed contact information in at least one of a communication log and the database of contacts if the contact associated with the displayed contact information is determined not to exist in a database of contacts.

21. The method of claim 20, wherein the storing of information corresponding to the displayed contact information in at least one of a communication log and the database of contacts comprises:
    extracting the information from the displayed content.

22. The method of claim 20, wherein the content is displayed in at least one of a website and a received message.

* * * * *